United States Patent [19]

Smith

[11] Patent Number: 5,742,667
[45] Date of Patent: Apr. 21, 1998

[54] NOTIFICATION OF TOLL FREE CALL CHARGING STATUS

[75] Inventor: David B. Smith, Hinsdale, Ill.

[73] Assignee: Lucent Technologies Inc., Murray Hill, N.J.

[21] Appl. No.: 658,767

[22] Filed: Jun. 5, 1996

Related U.S. Application Data

[63] Continuation of Ser. No. 350,939, Dec. 7, 1994, abandoned.

[51] Int. Cl.$^6$ .............. H04M 15/08; H04M 3/00
[52] U.S. Cl. .............. 375/112; 375/114; 375/67; 375/88; 375/89; 375/121; 375/201; 375/230
[58] Field of Search .............. 379/67, 88, 112, 379/114, 127, 115, 121, 143, 144, 201, 89, 230, 245

[56] References Cited

U.S. PATENT DOCUMENTS

| | | | |
|---|---|---|---|
| 4,191,860 | 3/1980 | Weber | 179/18 B |
| 5,003,584 | 3/1991 | Benyacar et al. | 379/119 |
| 5,146,491 | 9/1992 | Silver et al. | 379/114 |
| 5,184,345 | 2/1993 | Sahni | 379/114 X |
| 5,187,710 | 2/1993 | Chau et al. | 379/114 X |
| 5,199,062 | 3/1993 | Von Meister et al. | 379/205 X |

OTHER PUBLICATIONS

"American TelNet, FTC Settle '800'-Service Complaint", *Telecommunications Week*, Dec. 5, 1994, p. 7.

*Primary Examiner*—Wellington Chin
*Assistant Examiner*—Paul Loomis
*Attorney, Agent, or Firm*—Werner Ulrich; Mony R. Ghose

[57] ABSTRACT

A caller who calls an 800 number is given an audible or visual indication that the call will not incur any charges for services provided on that call by the called party. If such charges will be incurred the caller is warned and may terminate or continue the call. For certain classes of telephone subscribers such as coin stations wherein the caller is not always the same person as the one who pays the bills, calls wherein the caller may incur charges for services provided on the call are automatically routed to an operator; such calls can then be completed using credit or calling cards in order to transfer the charges from the owner of the telephone station to the caller who made the specific call.

11 Claims, 2 Drawing Sheets

5,742,667

NOTIFICATION OF TOLL FREE CALL CHARGING STATUS

This application is a continuation of application Ser. No. 08/350,939, filed on Dec. 7, 1994, now abandoned.

TECHNICAL FIELD

This invention relates to arrangements for charging customers for toll free calls.

PROBLEM

When 800 service, or, more generally, toll free service, was originally introduced, the concept that callers would not be charged for calls such as calls to vendors of service or equipment or merchandise quickly made the service popular both for the callers who would not be charged and for the vendors who thereby stimulated more calls and therefore more sales. 800 service also extended the size of the geographic region in which a vendor could sell its products, since callers were spared the toll charge. The characteristic of the service however has made it attractive for applications in which the caller is not charged for the communication service but was charged for a service provided by the called party. Thus it is used by online computer services such as CompuServe® and Prodigy® which legally charge callers for the time logged on with the service. More recently the service has also become popular for more marginal applications such as phone sex and psychic services. When the called party charges for such services, the called party obtains an indication of the number from which the caller is calling and transmits information to the local exchange carrier to bill the customer for these services. While the Federal Communications Commission has instituted practices which are intended to warn the caller that a charge will be incurred for the services provided for such calls, the wording of such a warning is rarely straightforward and the customer action required to authorize the charge typically consists of something as innocuous as entering a one from the caller's keypad.

As these practices proliferate there is great concern, on the part of the large toll carriers such as AT&T Corp., that callers will begin to lose faith in the toll free nature of 800 calling service and that such loss of faith will result in a slower growth or possibly even decrease in use of the popular toll free service that these carriers provide.

Another problem is that if a toll free call is made from a coin station to one of these services for example to phone sex service that the owner of the coin station rather than the caller is charged because the method of charging is to obtain the number of the calling station. Accordingly coin telephone operators have their choice of blocking all toll free services or risk incurring charges for calls by callers that they never authorized.

A problem of the prior art therefore is that the public is not provided with a positive assurance to the caller that an 800 call is in fact free of usage charges. Consequently, the public may lose confidence in its expectation that normal toll free calls are in fact free of all charges and the use of toll free service may suffer as a result.

SOLUTION

The above problem is solved and an advance is made over the prior art in accordance with the principles of applicant's invention wherein the data base used for providing routing information for toll free calls also provides information as to whether callers may incur charges for services provided during the call by the called party; this indication is then used to notify the caller of the charging status of a toll free type call. Advantageously callers are notified in a standard way as to whether charges may be incurred for such services provided by the called party in such a toll free type call. In accordance with one feature of the invention, the notification is received prior to the establishment of a completed call and therefore prior to the incurrance of charges by the station set owner.

In accordance with one feature of the invention if the call is of a type wherein the called party does charge for services provided during the call the call can either be blocked or preferably rerouted to an operator who can then complete the call using arrangements such as calling cards, credit cards, or debit cards, for identifying the caller rather than the calling telephone number for billing for services provided during the call. Advantageously, owners of telephones such as coin stations, who are the subscribers to telephone service but not the callers, do not risk incurring charges for services provided to the callers and if the call is rerouted to an operator than the callers can still complete their calls if they are willing to incur the charges.

The indications to the caller can be audible such as a tone or a gong or visual such as a lamp or characteristic display. The audible or visual indication is a unique identifier that becomes commonly known, through advertising and promotion, to be a notification that "no charges will apply to this call."

DETAILED DESCRIPTION

Figure 1:
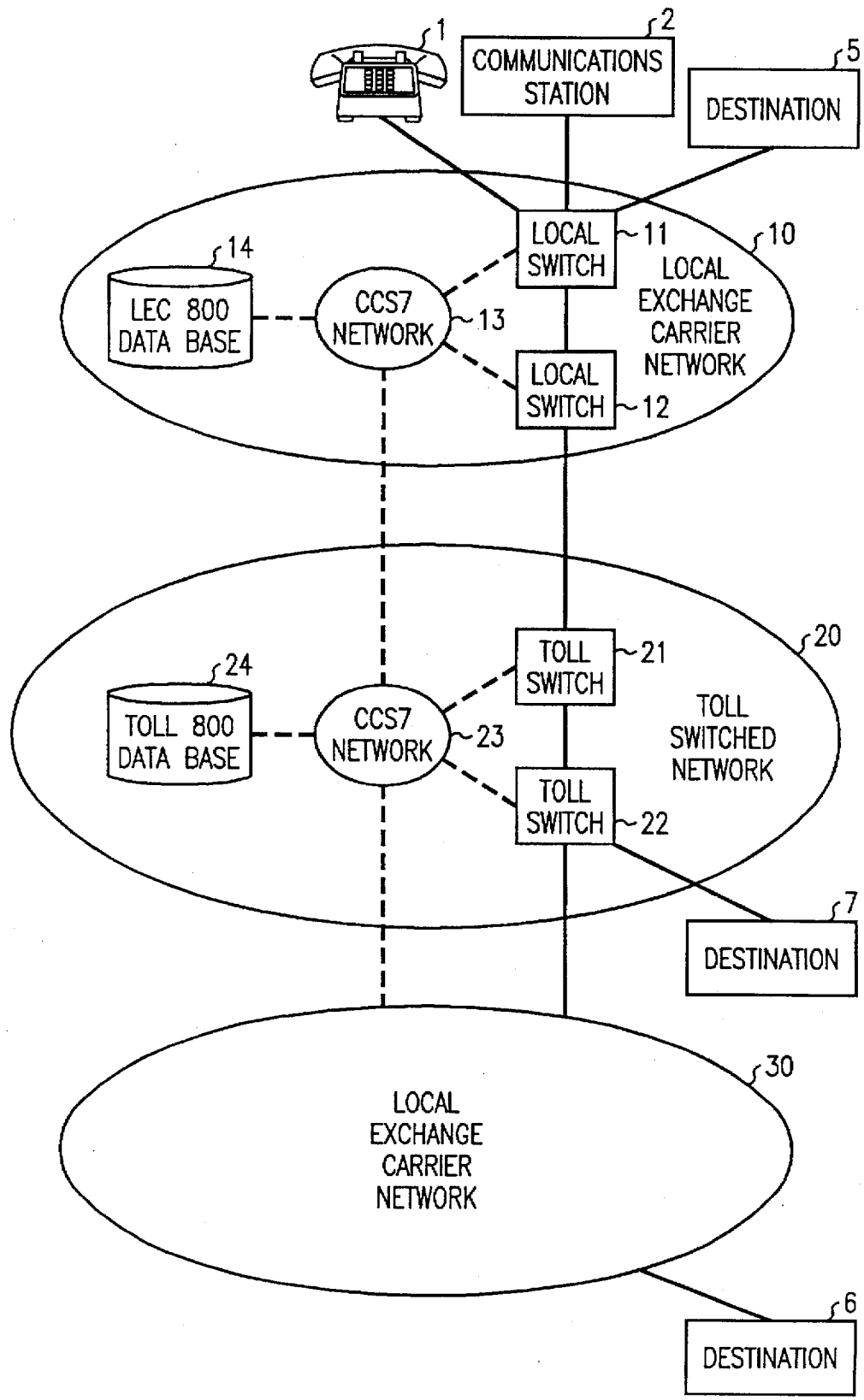
FIG. 1 is a block diagram illustrating the operation of applicant's invention.

FIG. 1 is a block diagram of a telecommunications network. Attached to the network are a conventional telephone 1 and a coin station 2 both connected to local exchange carrier network 10. The local exchange carrier network is connected to a toll switched network 20 which in turn is connected to another local exchange carrier network 19. Three possible destinations of a toll free call from one of the stations 1 or 2 are shown. Destination 5 is connected to the same local exchange carrier network 10 as stations 1 and 2 and therefore a call to destination 5 from station 1 or 2 is a call which requires only the use of the local exchange carrier network 10. A call to destination 6 requires the use of local exchange carrier network 10, toll switch network 20 and local exchange carrier network 19 which is connected to destination 6. Destination 7 is directly connected to toll switch network 20 and therefore does not require that local exchange carrier network 11 be used.

Toll free calls such as 800 type calls are translated in the local exchange carrier network 10 to determine which toll switched network is to be used for accessing the dialed destination. The establishment of connections to an 800 number is executed under the control of an intelligent network as shown in the block diagram of toll switched network 20. Toll switched network 20 includes an ingress toll switch 21 connected to originating local exchange carrier network 10 and an egress toll switch 22 connected to terminating local exchange carrier 11. The 800 number is translated in the Toll 800 data base which converts the 800 number a number that contains no routing information into a number having an area code and an office code which can be used for routing the call to a destination.

Existing 800 service data bases store information such as link identifiers for routing common channel signaling messages, and customer routing data to customize routing, for example, by day of week and time. In addition, AT&T, for example, provides for six classes of services (COS) that permit different grades of service; each is designed to meet specific customer network management criteria.

In addition, service indicator codes and caller class routing parameters are used to provide 800 service features such as traffic level routing for controlling network congestion. These identifiers are carried within the Transaction Capabilities Application Part (TCAP) of the SS7 protocol which may also be used to carry the billing status (COS) data. Service codes are used to define network management capabilities, and do not determine the billing status of the call.

The CCS7 common channel signaling network 23 transmits data messages among switches 21 and 22 and data base 24. This is in accordance with the principles described in R. P. Weber: U.S. Pat. No. 4,191,860 as modified to take into account the presence of competitive toll switched networks each of which serves a subset of the 800 destination customers. The caller dialing an 800 number is routed through this network but does not incur telephone connection charges because the program for converting call records into telephone bills treats all 800 calls differently in order to charge the destination customer rather than the caller for the connection charge. Local exchange carrier network 10 is equipped with local switches 11 and 12, local exchange carrier 800 data base 14, and a CCS7 common channel signaling network; the data base is used, for example, for making the translations required for a local exchange carrier call from station 1 to destination 5.

In accordance with the principles of applicant's invention, the data bases 14 and 24 store not only the routing number to permit the call to be completed using the prior art routing arrangements through toll switched networks and local exchange carrier networks but also provides an indication of the charging class of service of calls to each 800 telephone number. In one preferred embodiment of the invention there are three types of classes: the first class represents a straight toll free connection wherein the customer does not incur any charges for services provided on the call; a second class is for calls wherein the caller incurs a charge for a business service (such as data base access or other computer service), perhaps governed by a service agreement with the service provider; and a third class of service identifies calls wherein the caller is provided with a personal service (phone sex or psychic services) on a per call basis. The indication of this class of service is returned to the local switch connected to the caller through the common channel signaling network 23 and its equivalent network 13 in the local exchange carrier network. As will be explained with reference to FIG. 2 this information is used by the local switch to indicate to a customer whether or not a call incurs expenses for services provided by the destination and can be used to screen calls which incur such expenses so that it is either blocked or routed via an operator.

Figure 2:
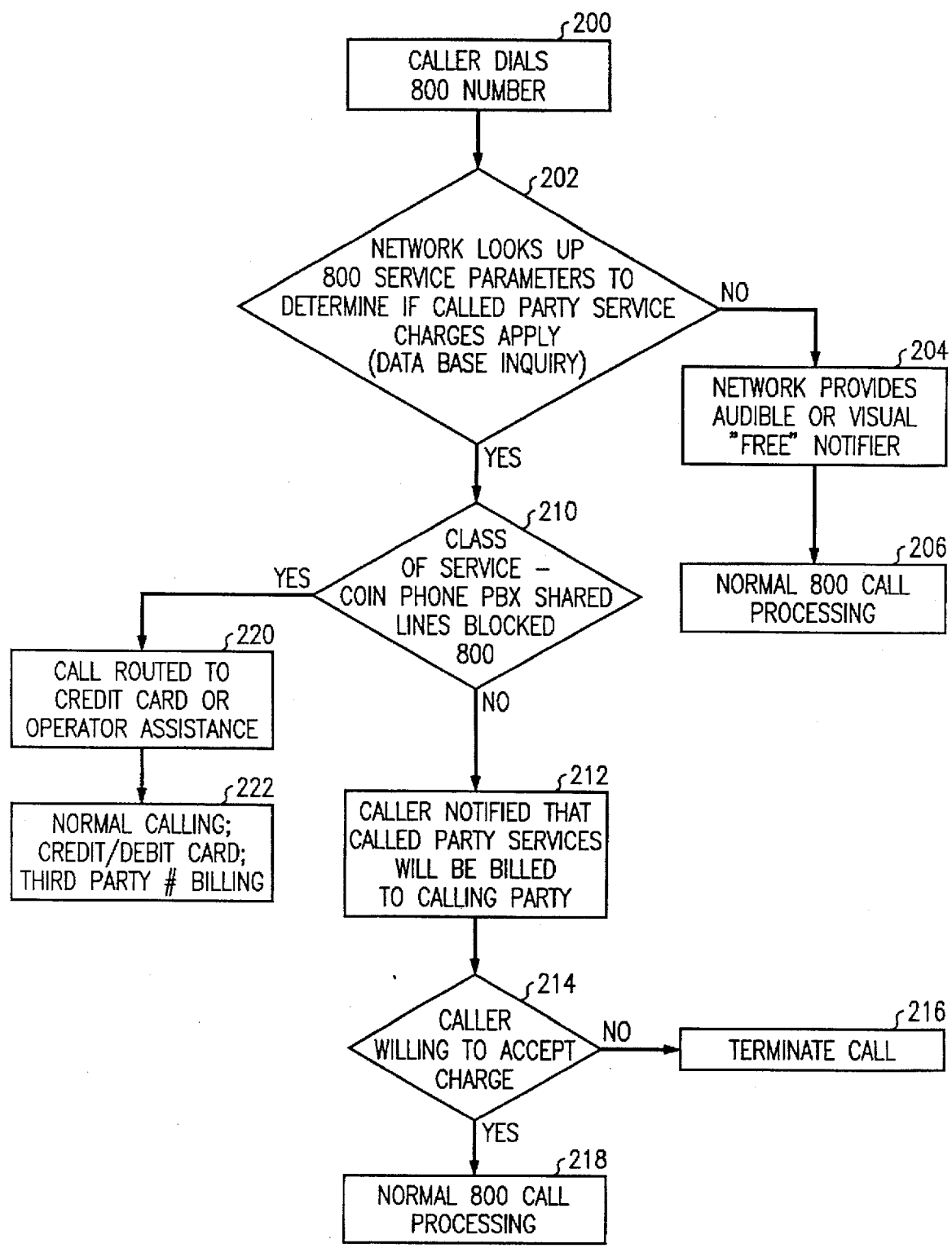
FIG. 2 is a flow diagram illustrating a method for implementing applicant's invention.

FIG. 2 is a flow diagram illustrating the operation of applicant's invention. The caller dials an 800 or other toll free number (action block 200). The network looks up the service parameters for the 800 number to determine if calling party service charges apply (test 202). This is done through a data base inquiry of data base 24 or data base 14 in local exchange carrier network 10 if the 800 number is only for use within the local exchange carrier area. If test 202 determines that no call party service charges apply then the network provides an audible or visual free call indication to the caller (action block 204) which indication advantageously includes a service carrier identifier (such as the AT&T audible logo), thus alerting the caller to the identity of the carrier of the 800 service. (Note that in the prior art, direct dialed 800 calls do not provide an indication of the carrier serving the call.) Examples of audible indicators are a gong, a tone, or a distinctive double or multiple frequency tone; examples of visual indicators are the operation of a lamp on the caller's telephone or an appropriate display such as a dollar sign with a slash through it for display on telephones having display capabilities. An example of an indicator to identify a carrier is the AT&T audible logo currently heard on assisted calls served by AT&T. Subsequently the call proceeds using normal 800 call processing (action block 206).

If the data base inquiry determines that calling party service charges do apply (positive result of test 202) then the local switch performs a class of service translation to determine whether the calling telephone requires screening of such calls. This class of service would be provided to coin telephones, to trunks connected to PBXs, to business establishments and also to residential telephones. If the class of service translation determines that the caller telephone is not one of these telephones for which screening of these specialized 800 calls is required, then the caller is notified that called party services will be billed to the calling party (action block 212). This notification is in the form of an announcement or other indication that is consistent with the guidelines provided by the Federal Communications Commission. The local switch then tests whether the caller is willing to accept the charges, for example, by keying a "1" (test 214). If the caller is not willing to accept the charge, the call is terminated (action block 216). If the caller is willing to accept the charges, then normal 800 call processing proceeds (action block 218).

If the class of service translation performed in test 210 indicates that the caller telephone has requested screening, then the call is routed to an assistance system for serving calling, debt or credit card calls or for connection to an operator position (action block 220). Thereafter the normal credit debit card or third party number billing is performed for that call so that the owner of the calling telephone is not directly charged. The determination of whether screening is to be performed can also be done by a PBX or other customer premises station group, such as a key telephone system, to allow some stations of the group to make such toll free calls but to deny this service to other stations.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of establishing a toll free telecommunications call connection over a telecommunications network, comprising the steps of:

responsive to receipt from a caller station of a call service request comprising an identification of a toll flee telecommunications destination, using call service parameters established by and stored in the network to determine whether caller telephone account charges will accrue for calls to said destination; and if said destination does not charge for said service, providing a network-formulated audible or visual indication to said caller station.

2. The method of claim 1 further comprising the steps of:

if said caller station will be charged for said services, determining whether said caller station has a class of service which does not permit direct billed connections to destinations which charge for said services; and if said caller station has a class of service which does not permit such direct billed connections, routing said call to an assistance system for further disposition.

3. The method of claim 2 wherein said assistance system automatically processes calling, credit or debit card calls.

4. The method of claim 2 wherein said assistance system connects said caller station to an operator position.

5. The method of claim 1 further comprising the steps of:

if said destination charges for said services, determining whether said caller station has a class of service which does not permit direct billed connections to destinations which charge for said services; and if said caller station has a class of service which permits such direct billing, provide a visual or audible indication to said caller station that a charge will be incurred for services provided by said destination.

6. The method of claim 1 further comprising the step of providing to said caller station an indication of an identity of a carrier for establishing said call over said network.

7. A method of establishing a toll free telecommunications call connection over a telecommunications network, comprising the steps of:

responsive to receipt from a caller station of a call service request comprising an identification of a toll free telecommunications destination, using call service parameters established by and stored in the network to determine whether caller telephone account charges will accrue for services provided on a call from said destination;

determining whether said caller station has a class of service which permits direct billed connections to destinations which charge for said services; and if said destination does not charge for said services, providing a network-formulated audible or visual indication to said caller station.

8. The method of claim 7 further comprising the steps of:

if said caller station has a class of service which permits direct billed connections to destinations which charge for said services and if said destination charges for said services, providing a second audible or visual indication from said network to said caller station.

9. The method of claim 8 wherein the step of providing a second audible or visual indication comprises the step of providing said second audible or visual indication prior to establishing a connection to said destination.

10. The method of claim 7 wherein the determining step comprises determining whether a caller station within a private branch exchange or other customer premises station group has a class of service which permits direct billed connections to destinations which charge for said services.

11. The method of claim 7 further comprising the step of providing an indication to said caller station to said caller station of an identity of a carrier for establishlishing said call over said network.

* * * * *

UNITED STATES PATENT AND TRADEMARK OFFICE
CERTIFICATE OF CORRECTION

PATENT NO. : 5,742,667

DATED : April 21, 1998

INVENTOR(S) : David B. Smith

It is certified that error appears in the above-identified patent and that said Letters Patent is hereby corrected as shown below:

Column 4, claim 1, line 62, delete "flee" and substitute --free--.

Signed and Sealed this

Tenth Day of November 1998

*Attest:*

BRUCE LEHMAN

*Attesting Officer*    Commissioner of Patents and Trademarks